July 20, 1943.  W. J. GEIST  2,324,501
SEAMING MACHINE
Filed Feb. 17, 1941  2 Sheets-Sheet 1
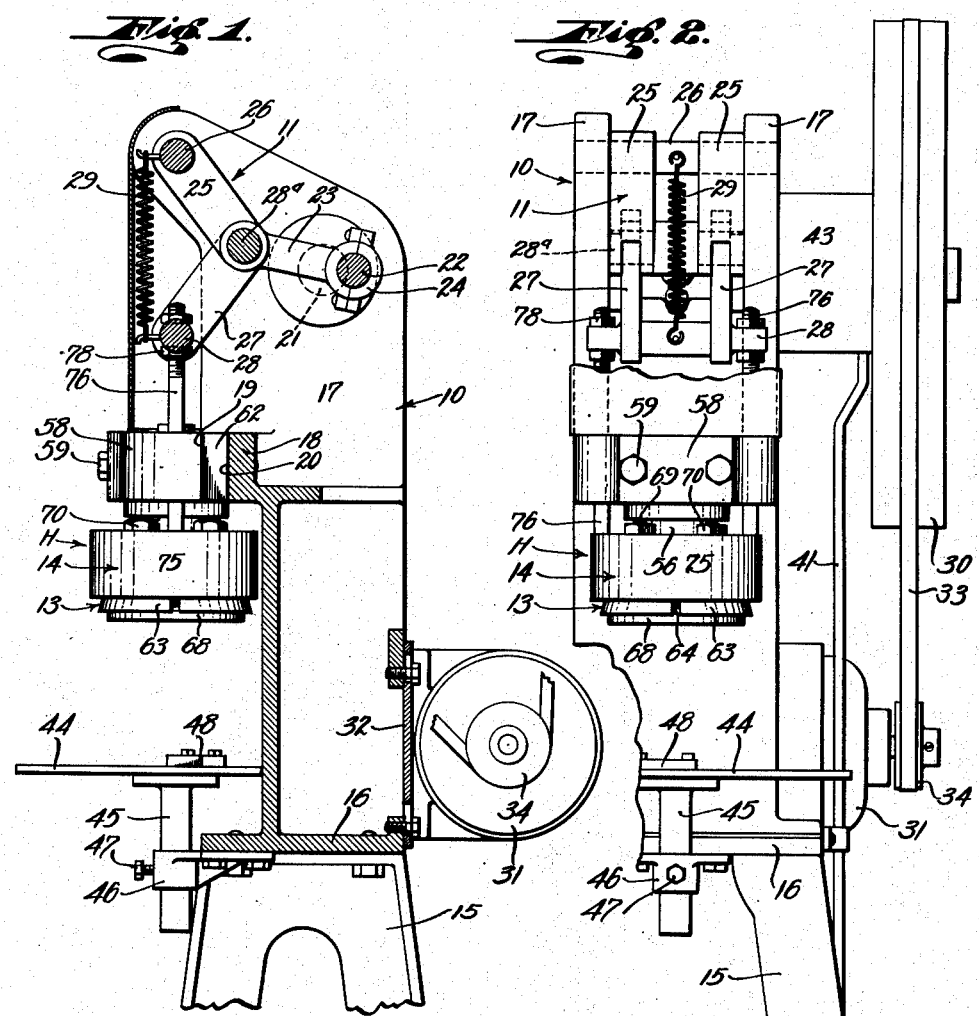
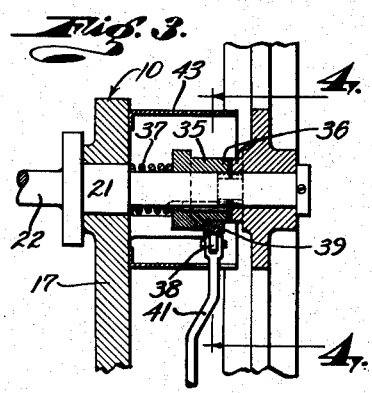
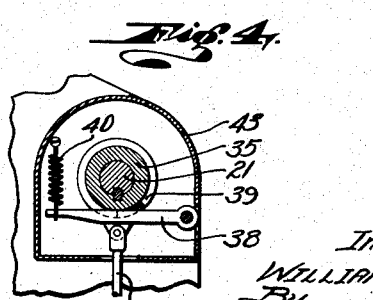
Inventor
WILLIAM J. GEIST
By
His Attorney July 20, 1943.    W. J. GEIST    2,324,501
SEAMING MACHINE
Filed Feb. 17, 1941    2 Sheets-Sheet 2
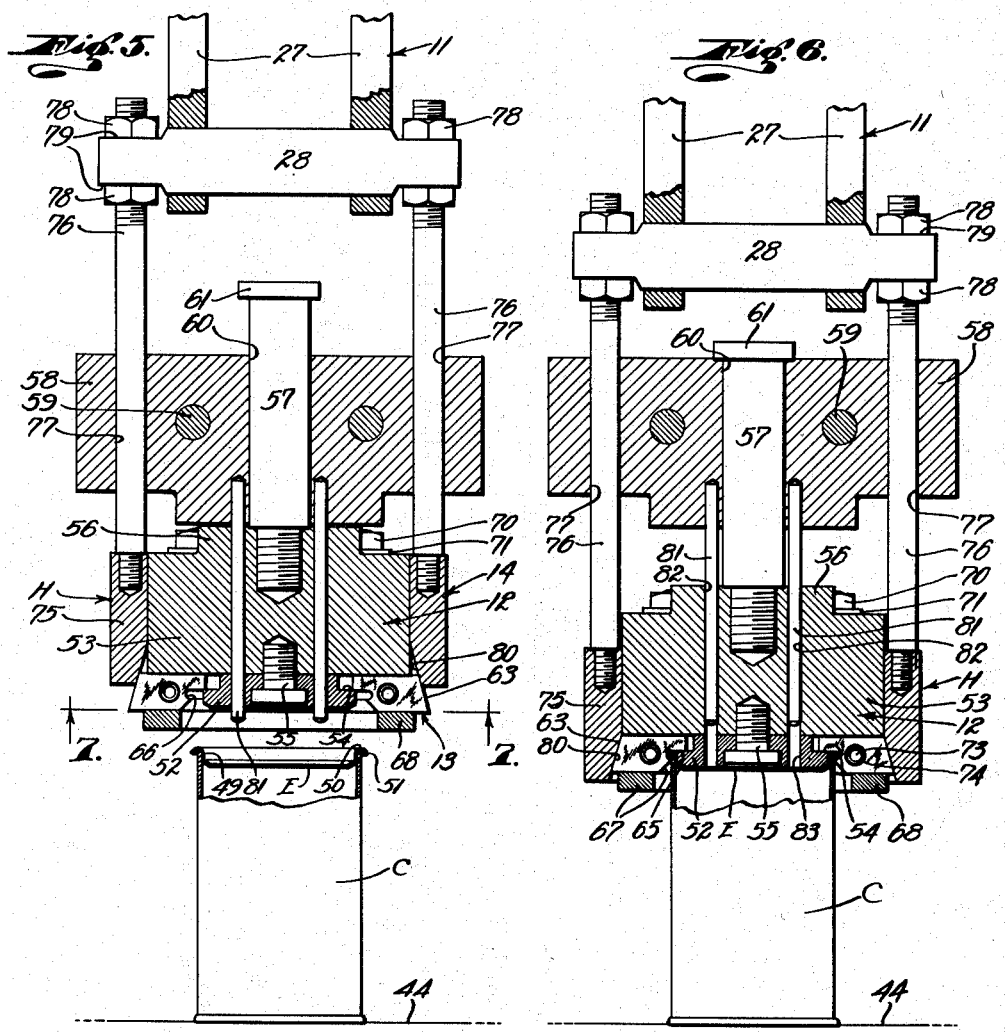
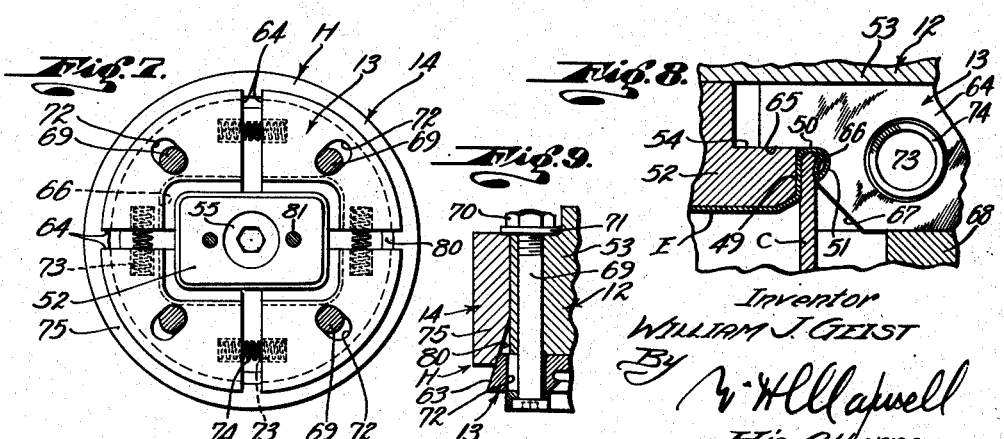
Inventor
WILLIAM J. GEIST
By
R. H. Capwell
His Attorney Patented July 20, 1943

2,324,501

UNITED STATES PATENT OFFICE 2,324,501

SEAMING MACHINE

William J. Geist, St. Louis, Mo., assignor, by mesne assignments, to Continental Can Company, Inc., New York, N. Y., a corporation of New York Application February 17, 1941, Serial No. 379,335

12 Claims. (Cl. 113—18)

This invention relates to machines useful in the manufacture of containers and relates more particularly to machines for seaming heads or ends on containers. A general object of this invention is to provide a simple, inexpensive and very efficient seaming machine.

The machines now in general use for seaming ends on containers usually embody rotating rolls or dies for spinning the seams. The machines employing rotating dies are complicated and expensive to manufacture and require mechanism for moving the containers vertically to and from the seaming chucks. The movement of the containers to and from the chucks consumes considerable time, reducing the operating speed of the machine, and the movement tends to disturb or displace the containers particularly in cases where the machine is operated at a high speed.

Another object of this invention is to provide a machine for seaming the ends on containers in which the container ends are seamed on the container bodies without employing rotating rollers or dies thereby greatly simplifying the construction and materially reducing the cost of manufacture.

Another object of this invention is to provide a seaming machine of the character referred to in which the container may remain stationary throughout the seaming operation to eliminate the necessity for a mechanism for shifting the container to and from the sealing chuck and providing for a greater operating speed.

Another object of this invention is to provide a seaming machine of the character referred to embodying a novel seaming head in which the chuck elements, the die operating parts, etc. are telescopically related for relative movement along a common axis to permit the easy placement and removal of the containers and to produce an efficient die actuation.

Another object of this invention is to provide a machine of the character mentioned embodying particularly effective dies and die operating means which may be constructed for the seaming of container heads or ends of practically any shape.

A further object of the invention is to provide a seaming machine of the character referred to in which the dies, the chuck parts, the die operating means and other parts of the seaming head are simple and inexpensive to manufacture and are readily installed and replaced to adapt the machine for the seaming of containers and container ends of different shapes and sizes.

The various objects and features of my invention will be fully understood from the following detailed description of a typical preferred form and application of my invention, throughout which description reference is made to the accompanying drawings, in which:

Fig. 1 is a side elevation of the major portion of the machine with the frame and the toggle means in vertical cross section. Fig. 2 is a fragmentary front view of the machine. Fig. 3 is an enlarged fragmentary vertical detailed sectional view illustrating the clutch. Fig. 4 is a fragmentary vertical detailed sectional view of the clutch taken as indicated by line 4—4 on Fig. 3. Fig. 5 is an enlarged vertical detailed sectional view of the seaming head and adjacent parts showing the head in the raised or unactuated position. Fig. 6 is a view similar to Fig. 5 showing the seaming head in the operated condition with the dies in the seam forming positions. Fig. 7 is a horizontal detailed sectional view taken substantially as indicated by line 7—7 on Fig. 5. Fig. 8 is an enlarged fragmentary vertical detailed sectional view of the seaming head showing a die in its final seam forming position and Fig. 9 is a fragmentary vertical detailed sectional view of the seaming head illustrating one of the connecting and stop bolts.

The seaming machine of the present invention may be said to comprise, generally, a frame 10, a power driven operating means 11 carried by the frame 10, and a seaming head H operated by the means 11 and comprising a chuck 12, dies 13 carried by the chuck and operating means 14 for the dies.

The frame 10 serves to carry the various parts of the machine and may be varied greatly in design and construction depending upon the size and capacity of the machine. In the typical case illustrated the frame 10 is a generally upright structure carried by suitable legs 15. The frame 10 may have a flange 16 attached to the legs 15. The upper part of the frame 10 embodies a pair of spaced upright plate-like supports 17. A web 18 extends between and connects the lower parts of the supports 17 and has a forwardly facing mounting surface 19 provided with a vertical slot or channel 20.

The operating means 11 is provided to reciprocate or operate the seaming head H. The operating means 11 may be varied greatly depending upon the size and capacity of the machine and upon the manner in which the machine is to be controlled. In the case illustrated the means 11 is a continuously operating power means having a manually controlled clutch drive for operating the head H.

The operating means in the embodiment illustrated includes a generally horizontal shaft 21 rotatably carried by the spaced supports 17. The shaft 21 is formed to have an eccentric or crank 22 between the supports 17. The crank 22 operates a toggle mechanism which in turn operates the head H. A connecting rod 23 has a suitable bearing 24 on the crank 22 and extends forwardly to the toggle mechanism. A pair of toggle links 25 is supported by a horizontal shaft 26 on the supports 17 and the links 25 extend downwardly at opposite sides of the connecting rod 23. The lower parts of the links 25 are yoked to receive the upper end portions of the lower toggle links 27. A horizontal connecting pin 28ª passes through openings in the rod 23 and the links 25 and 27 to operatively connect the rod 23 with the toggle links. A generally horizontal wrist pin 28 is turnably received in openings in the lower parts of the links 27. It will be seen that the crank 22 serves to reciprocate or move the wrist pin 28 up and down through the medium of the toggles 25 and 27. A tension spring 29 may have its ends anchored to the pins 26 and 28 to assist the return movement of the wrist pin 28 and seaming head H.

The drive for the crank shaft 21 may comprise a pulley or wheel 30 freely turnable on an extension of the shaft. A suitable electric motor 31 is mounted on the frame 10 by a bracket 32 and is positioned below the wheel 30. A belt 33 operates over a pulley 34 on the motor shaft and over the wheel 30 so that the motor may continuously rotate the wheel 30. The bracket 32 may be adjustable on the frame 10 to tighten the belt 33. The motor 31 may be in continuous operation when the machine is in use and may be controlled in any selected way.

A manually controlled clutch is provided for connecting the motor driven wheel 30 with the crank shaft 21. This clutch may be of any selected type. In the particular case illustrated the clutch includes a clutch sleeve 35 slidably keyed on the shaft 21. The sleeve 35 and the wheel 30 have teeth 36 which are engageable for the transmission of rotation from the wheel to the shaft 21. A spring 37 may be arranged under compression between the sleeve 35 and the adjacent frame support 17 to urge the sleeve to its clutched position. The means for declutching the sleeve 35 comprises a lever 38 pivotally mounted on the frame 10 to extend under the sleeve 35. The lever 38 is arranged to engage a cam face 39 on the sleeve 35 to shift the sleeve to the released or declutched position where the teeth 36 are out of engagement. A spring 40 is connected with the lever 38 to urge the lever upwardly for cooperation with the cam face 39. A rod 41 is pivotally connected with the lever 38 and has a manual operating part for the control of the lever. As illustrated in Fig. 2 a pedal 42 may be provided to operate the rod 41. The spring 40 may serve to normally urge the lever 38, the rod 41 and the pedal 42 to the raised positions for disengaging the clutch sleeve 35 from the wheel 30. The clutch may be enclosed in a suitable housing 43 at one side of the frame 10. It is to be understood that the clutch just described is merely one form of clutch that may be embodied in the machine and the invention is not restricted to the use of this particular form of clutch.

The machine preferably includes a support or table 44 for carrying the containers for the seaming operations. The table 44 is arranged at the front of the frame 10 below the seaming head H and is preferably mounted for vertical adjustment to adapt the machine for the handling of containers of different heights or lengths. A post or stem 45 extends from the under side of the table 44 and is slidably carried by a guide or bracket 46 attached to the frame flange 16. A set screw 47 may be employed to hold or secure the table 44 at the selected heights. A block 48 of suitable shape is removably attached to the upper side of the table 44 to position or locate the containers in vertical alignment with the seaming head H. The locating block 48 may be varied in size, shape and position to locate containers of different kinds.

The seaming head H embodies important features of the invention. The head H may be varied in design and construction to act on or handle container ends of different constructions, shapes and sizes. In the typical embodiment of the invention illustrated the head H is designed to seam metal ends E on container bodies or containers C of paper, cardboard, or similar fibrous material and the containers and their ends are polygonal or rectangular. The metal ends E are supplied with preformed axial flanges 49, rims 50 extending radially or outwardly from the flanges 49 and partially formed beads or seam curls 51 depending from the rims 50. The details of a container end E are best shown in Fig. 8. The axial flange 49 of the end E is adapted to fit within the wall of the container C and the rim 50 is adapted to rest on the edge or end of the container body. Prior to the seaming operation the bead or curl 51 is spaced a sufficient distance from the flange 49 to allow the edge of the container body or container C to be freely received between the flange and curl. This allows the head or end E to be readily arranged on the container C for the seaming operation. The corners of the polygonal container C and the end E are suitably rounded. The depressed major portion of the container end E may be flat as shown, it being apparent that it may be corrugated or otherwise shaped if desired.

The structure or assembly of the head H, which I have termed the chuck 12, carries the dies 13 and is adapted to engage within the container end E to form a backing or support for the flange 49 and the wall of the container C to prevent distortion of these parts during the seaming operation. The chuck 12 includes an anvil or chuck block 52 and a carrier block 53. The chuck block 52 is shaped and proportioned to fit within the container end E to form a backing or anvil during the seaming operation. Accordingly, in the case illustrated, the block 52 is generally rectangular with rounded corners and is proportioned to rather closely fit within the flange 49 of the end E. The lower end of the block 52 may be flat and horizontal to engage with or lie parallel to the upper face of the container end E. The upper end of the chuck block 52 is flat and horizontal but is stepped back at its edge to provide an upwardly facing shelf 54. The shelf 54 is preferably continuous throughout the edge of the block 52 and is smooth or finished. The upper end of the chuck block 52 engages against the lower face of the carrier block 53. A cap screw 55 is passed through a central opening in the chuck block 52 and is threaded into the carrier block 53 to removably attach the block 52 to the block 53.

The head of the screw 55 is recessed or set in the lower end of the block 52. The carrier block 53 is preferably a cylindrical member considerably larger in diameter or horizontal dimensions than the chuck block 52 and is of substantial length or height. The outer surface of the carrier block 53 is smooth or finished. A central boss 56 of reduced diameter is formed on the upper end of the carrier block 53.

The chuck 12 is supported for limited vertical movement between the raised position shown in Figs. 1, 2 and 5 where the container C may be readily positioned under the head H and the lowered position of Fig. 6 where the chuck block 52 engages in the container end E. A stem or stud 57 is threaded in a central opening in the carrier block 53 and extends upwardly from the block. The stud 57 is preferably shouldered to engage against the upper end of the boss 56, as illustrated in Figs. 5 and 6. A guide 58 is attached to the front face 20 of the machine frame 10 by spaced screws or bolts 59 and has a central vertical opening 60 slidably receiving the stud 57. The head 61 of the stud 57 is engageable with the upper side of the guide 58 to limit the downward movement of the chuck 12. The upper end of the boss 56 may engage the under side of the guide 58 to limit the upward movement of the chuck 12. The guide 58 may have a tongue 62 engaged in the channel 20 of the machine frame 10.

The dies 13 are carried by the chuck 12 and are operable by the means 14 to press the seam curl 51 inwardly into gripping and sealing cooperation with the container C to complete the seam. There is a series or plurality of like dies 13 carried by the chuck 12 for sliding movement between expanded inactive positions and contracted positions where they form the seam. While the number of dies 13 may be varied in different installations I have found it desirable to employ four dies in the form of the invention shown. The dies 13 are generally segmental in shape having curved peripheral faces 63 and convergent generally radial edge faces 64. The peripheral faces 63 of the dies 13 slope downwardly and outwardly and are finished for engagement by the means 14, as will be later described. The upper and lower sides of the dies 13 are preferably flat and parallel.

The inner edges of the seaming dies 13 are shaped or contoured to give the seam curl 51 its final configuration. Thus, in the case illustrated, the inner edges of the dies 13 are angular to each engage against and conform to a corner and the adjacent parts of the container end E. The shape of the dies 13 is such that the die assembly engages completely around the end E when contracted onto the seam and the edges 64 come into engagement or almost engage at this time so that there is unbroken engagement between the dies and the edge of the container end E. The inner edge of each die 13 has a downwardly facing shoulder 65 and a groove 66 whose wall continues outwardly from the shoulder 65. The grooves 66 face inwardly and are shaped to receive and form the seam curl 51. The shoulders 65 are adapted to slidably ride on the rim 50 to prevent bending or distortion of the seam when the dies move inwardly to complete the shaping of the seam curl 51 and slidably rest on the shelf 54. As illustrated in Fig. 8 of the drawings, the grooves 66 are shaped to bend the seam curl 51 downwardly and inwardly so that it tightly grips the wall of the container C to attach the end E and to provide a seal with the container. Guide faces 67 slope downwardly and outwardly from the grooves 66 to assist in bringing the container C into the correct relation to the chuck block 52 and dies 13. The die shoulders 65 slidably bear on the shelf 54 of the chuck block 52 to assist in supporting and guiding the dies.

The dies 13 are arranged at the lower end of the carrier block 53 in surrounding relation to the chuck block 52. The upper faces of the dies 13 ride on the lower end of the carrier block 53. A pressure ring 68 is spaced below the carrier block 53 to shiftably or slidably support the dies 13. The lower sides of the dies 13 slide on the upper surface of the ring 68 and the ring serves to hold the dies in positions where their upper sides ride on the lower end of the carrier block 53. The ring 68 is proportioned so that it is spaced entirely clear of the container C. The ring 68 is suspended from the block 53 by spaced bolts 69, see Fig. 9. The bolts 69 have their heads set in the lower end of the ring 68 and the bolts pass upwardly through vertical openings in the ring and the carrier block 53. Nuts 70 are threaded on the upper parts of the bolts 69 and may be adjusted to obtain an accurate setting of the ring 68 so that the dies 13 are held in sliding engagement with the under side of the carrier block 53. The nuts 70 are at the base of the boss 56 and, in accordance with the invention, project beyond or overhang the periphery of the carrier block 53. If desired or found necessary, washers 71 may be arranged under the nuts 70 to increase the overhang. Radial slots 72 are formed in the dies 13 to slidably pass the bolts 69. I prefer to have a bolt 69 pass through each die 13. The cooperation of the slots 72 with the bolts 69 limits the extent of movement of the dies 13 and guides the dies for in and out movement.

Spring means are provided for normally holding the dies 13 in their out or extended positions and for returning the dies to these positions following each operation. The opposing radial edges 64 of the dies 13 have aligned transverse sockets 73 and compression springs 74 are engaged in these sockets. The springs 74 engage between the adjacent dies 13 and urge the dies outwardly. The inner ends of the slots 72 are engageable with the bolts 69 to limit the outward movement of the dies 13. The sockets 73 are of sufficient depth to completely receive the springs 74 when the dies are in their active or retracted positions.

The means 14 is operated by the power driven means 11 to produce reciprocation of the chuck 12 and inward actuation of the dies 13. The means 14 includes a ring or sleeve 75 slidably engaged on or telescoped over the carrier block 53. The sleeve 75 is operatively connected with and carried by the wrist pin 28 of the above described toggle mechanism. Spaced stems or rods 76 are threaded in sockets in the upper end of the sleeve 75 and pass upwardly through openings 77 in the guide 58. The rods 76 are slidable in the openings 77 to guide the sleeve 75 and to assist in guiding the chuck 12. The rods 76 pass through openings in the end portions of the pin 28 and nuts 78 are threaded on the rods 76 to clamp against flat upper and lower surfaces 79 of the pin 28 to attach the rods to the pin. The nuts 78 may be adjusted to accurately set or adjust the sleeve 75. It will be seen that the means 11 operating through the medium of the wrist pin 28 and rods 76 is operative to reciprocate the sleeve 75.

As best illustrated in Fig. 9 of the drawings, the upper end of the sleeve 75 is engageable with the nuts 70 or the washers 71. This occurs during the up stroke of the sleeve 75 and the engagement causes the chuck 12 to be raised with the sleeve during the final or second portion of its upward movement. In this way the sleeve 75 is adapted to raise the chuck 12 to the retracted position illustrated in Fig. 5.

The sleeve 75 is in the nature of a cam for actuating the dies 13. The lower portion of the sleeve 75 has an internal downwardly and inwardly sloping cam face 80 for cooperating with the pitched peripheral faces 63 of the dies 13. During the second or final portion of downward movement of the sleeve 75 the chuck 12 is held against further downward movement by its engagement with the container end E and as the sleeve 75 continues to move downwardly its face 80 cooperates with the faces 63 to force the dies 13 inwardly so that they seam the end E onto the container C. This action will be more fully described.

The seaming head H may further include means for stripping or disengaging the containers C from the head during the return or upward strokes of the chuck 12. This means may include a pair of spaced stripper rods 81 fixed in the stationary guide 58 and extending downwardly therefrom to be received in openings 82 in the carrier block 53. Openings 83 are provided in the chuck block 52 to pass or receive the stripper rods 81. When the chuck 12 is moved upwardly by the engagement of the sleeve 75 with the washers 71 or the nuts 70, the openings 83 receive the stripper rods 81 and the rods ultimately extend from the lower ends of the openings 83 so that they engage the container end E in the event the container remains engaged on the upwardly moving chuck. The relative movement between the chuck 12 and the stationary stripper rods 81 frees or disengages the container C from the chuck.

In the operation of the machine, the container C carrying the end E is placed on the table 44 and is positioned against the block 48 to be oriented with respect to the head H. At this time the head H is in its raised position illustrated in Figs. 1, 2 and 5 and the container may be readily positioned under the head. When the container is in position the clutch sleeve 35 is engaged or clutched with the wheel 30 by depressing the pedal 42. This produces rotation of the shaft 21 and operation of the toggle means 25–27. The toggle means moves the sleeve 75 downwardly and then returns the sleeve to its normal raised position. During the first part of the downward stroke of the sleeve 75 the chuck 12 moves downwardly with the sleeve under the action of gravity. The chuck 12 moves downwardly until the chuck block 52 is engaged in the container end E, at which time the downward movement of the chuck 12 is stopped by the engagement of the stud head 61 with the guide 58. This action positions the dies 13 at the seam curl 51. The sleeve 75 continues to move downwardly and as it moves downwardly with respect to the chuck 12 the cam face 80 cooperates with the pitched peripheral faces 63 of the dies 13. This cooperation forces the dies 13 inwardly or toward one another. As the dies move inwardly their grooves 66 receive and act on the seam curl 51 and the curl is turned or bent downwardly and inwardly into secure holding and securing engagement with the wall of the container C.

When the cam ring 75 begins its upward stroke the chuck 12 remains stationary under the action of gravity and the sleeve moves upwardly with respect to the chuck. During this relative movement the cam face 80 shifts up on the sloping peripheral faces 63 of the dies 13 and the springs 74 automatically restore the dies 13 to their retracted positions clear of the container. Following the retraction of the dies 13 the upper end of the sleeve 75 engages the nuts 70 or the washers 71 and as the upward movement of the sleeve 75 continues the chuck 12 moves upwardly with the sleeve. In this manner the chuck 12 is returned to its retracted position to bring the boss 56 against or adjacent the guide 58. During the upward movement of the chuck 12 the stripper rods 81 project from the under side of the chuck block 52 to strip or free the container from the chuck in the event the container tends to remain in the chuck. At the end of the seaming operation the container C is removed from under the head H and another container carrying an end E is positioned for the next operation.

Having described only a typical preferred form and application of my invention, I do not wish to be limited or restricted to the specific details herein set forth, but wish to reserve to myself any variations or modifications that may appear to those skilled in the art or fall within the scope of the following claims.

Having described my invention, I claim:

1. In a machine for seaming ends on containers, a support for a container which has an end arranged thereon, a chuck movable into and out of engagement with said end, the chuck including an anvil adapted to engage said end to fit within its seam, dies shiftably carried by the chuck for bodily movement toward and away from the anvil, a cam telescopically related to the chuck for movement toward and away from said end and operable to actuate the dies inwardly into seaming engagement with said end upon movement toward said end relative to the chuck, and parts on the chuck and cam initially supporting the chuck where the chuck is spaced from said end and disengaged to allow movement of the cam relative to the chuck when the chuck has come into engagement with said end.

2. In a machine for seaming ends on containers, a support for a container which has an end arranged thereon, a chuck movable into and out of engagement with said end, the chuck including an anvil adapted to engage said end to fit within its seam, dies shiftably carried by the chuck to bodily move in the horizontal plane occupied by the anvil, a cam for actuating the dies inwardly against said end to seam the same to the container and shiftably telescopically related to the chuck, means for moving the cam vertically toward and away from said container, and parts on the chuck and cam initially engaging to support the chuck in spaced relation to said end, disengaged during movement of the cam toward said end when the chuck reaches said end so that the continued movement of the cam toward the container actuates the dies and re-engaged to move the chuck away from said end during movement of the cam away from the container.

3. In a machine for seaming an end on a stationarily supported container, a chuck movable from a retracted position above the container and a position at said end, a set of dies slidably supported on the lower end of the chuck for inward and outward movement, an overhanging abutment on the chuck, a sleeve slidable on the chuck, means for moving the sleeve up and down between a raised position where it engages the abutment to hold the chuck above the container end and a lower position where it has moved away from the abutment with the chuck at said end, the downward movement of the sleeve allowing the chuck to move downward to the container end, a cam surface on the sleeve for moving the dies inwardly to seam said end when the sleeve moves downwardly relative to the chuck, and means for moving the dies outwardly when the sleeve moves upwardly comprising compression springs engaged between the opposing edges of the dies.

4. In a machine for seaming an end on a stationarily supported container, a sleeve movable up and down relative to the container, power means for moving the sleeve, a movable chuck within the sleeve adapted to engage within the container end, a downwardly facing shoulder on the chuck adapted to rest on the sleeve when the sleeve is in its raised position to hold the chuck above the container and allowing the chuck to move downwardly by gravity to said end during downward movement of the sleeve, a ring carried by the chuck in spaced relation to its lower end, segmental dies supported between the ring and the lower end of the chuck for individual bodily movement, an annular cam face on the sleeve for moving the dies inwardly to seam the container end when the sleeve moves downwardly relative to the chuck, and means for moving the dies outwardly when the sleeve moves upwardly relative to the chuck.

5. In a machine for seaming an end on a stationarily supported container, a chuck movable from a retracted position clear of the container and a position at said container end, a ring spaced below the chuck, bolts carrying the ring and passing upwardly through the chuck, dies shiftably held between the ring and chuck for bodily inward and outward movement, a shiftable sleeve telescoping over the chuck and having a cam face at its lower portion for forcing the dies inwardly, means for moving the sleeve up and down, and parts on the bolts engaged by the upper end of the sleeve to support the chuck when the sleeve is in its raised position and to allow the chuck to move down to the container end during a part of the downward movement of the sleeve, the cam face actuating the dies inwardly during the remainder of the downward movement of the sleeve.

6. In a machine for seaming an end on a stationarily supported container, a chuck movable from a retracted position clear of the container and a position at said container end, a ring spaced below the chuck, bolts carrying the ring and passing upwardly through the chuck, dies shiftably held between the ring and chuck for inward and outward movement, the dies having slots receiving the bolts to be guided by the bolts, a shiftable sleeve telescoping over the chuck and having a cam face at its lower portion for forcing the dies inwardly, means for moving the sleeve up and down, and parts on the bolts engaged by the upper end of the sleeve to support the chuck when the sleeve is in its raised position and to allow the chuck to move down to the container end during a part of the downward movement of the sleeve, the cam face actuating the dies inwardly during the remainder of the downward movement of the sleeve.

7. In a machine for seaming an end on a stationarily supported container, a chuck movable from a retracted position above the container and a position at said end, a set of dies slidably supported on the lower end of the chuck for inward and outward movement, an overhanging abutment on the chuck, a sleeve slidable on the chuck, means for moving the sleeve up and down between a raised position where it engages the abutment to hold the chuck above the container end and a lower position where it has moved away from the abutment with the chuck at said end, the downward movement of the sleeve allowing the chuck to move downward to the container end, a cam surface on the sleeve for moving the dies inwardly to seam said end when the sleeve moves downwardly relative to the chuck, and means for stripping the container from the chuck during upward movement of the chuck comprising a fixed rod received in an opening in the chuck to project from its lower end when the chuck is in a raised position.

8. A machine for seaming ends on containers comprising a frame, a table on the frame for supporting a container, a guide above the table, a chuck guided by the guide for movement between a raised position clear of the container and a lowered position where it engages in the end of the container, a set of bodily movable dies on the lower end of the chuck, a sleeve shiftably telescoped over the chuck and having a cam face for actuating the dies upon downward movement of the sleeve relative to the chuck to seam the end on the container, rods on the sleeve guided by the guide, power driven means on the frame for reciprocating the rods, and a shoulder on the chuck engaged by the sleeve when the sleeve is raised to hold the chuck above the container and re-engaged by the sleeve to return the chuck to its raised position when the sleeve moves upwardly, the chuck moving down to the container end by gravity during the first portion of the down stroke of the sleeve.

9. In a machine for seaming an end on a container, the end having a raised seam, the machine including a chuck movable between a retracted position and a position at the container end, an anvil on the chuck adapted to fit within the seam when the chuck is in the position at the container, the anvil having a shelf opposing the end of the chuck, a set of bodily shiftable dies having parts engaged between said shelf and the end of the chuck to be guided for movement toward and away from the seam, cam means for simultaneously moving the dies inwardly against the seam when the anvil is within the seam, and means for shifting the dies outwardly.

10. In a machine for seaming an end on a container, the end having a raised seam, the machine including a chuck movable between a retracted position and a position at the container end, an anvil on the chuck adapted to fit within the seam when the chuck is in the position at the container, the anvil having a shelf opposing the end of the chuck and extending inwardly from the periphery of the anvil, a support carried by the chuck and spaced below its lower end, a set of dies shiftably supported between the end of the chuck and the support for bodily movement inwardly toward the seam, the dies having tongues on their inner edges slidably received between said shelf and the end of the chuck for guiding the dies directly above where they engage the seam, and means for forcing the dies inwardly.

11. In a machine for seaming an end on a container, the end having a raised seam, the machine including a chuck movable between a retracted position and a position at the container end, an anvil on the chuck adapted to fit within the seam when the chuck is in the position at the container, a set of dies supported at the lower end of the chuck for individual movement toward the seam, and a member movable relative to the chuck having a sloping surface which cooperates with the dies in the horizontal plane occupied by the anvil to force the dies inwardly.

12. In a machine for seaming an end on a container, the end having a raised rectangular seam bead, the machine comprising a support for the container, a chuck body movable toward the container, a rectangular anvil on the body adapted to fit within the bead, a set of bodily shiftable dies supported at the lower end of the body to move inwardly against the seam, each die having two angularly related active faces for cooperating with two angularly related parts of the seam which join at a corner of the seam, and means for moving the dies inwardly against the seam.

WILLIAM J. GEIST.